//patents.google

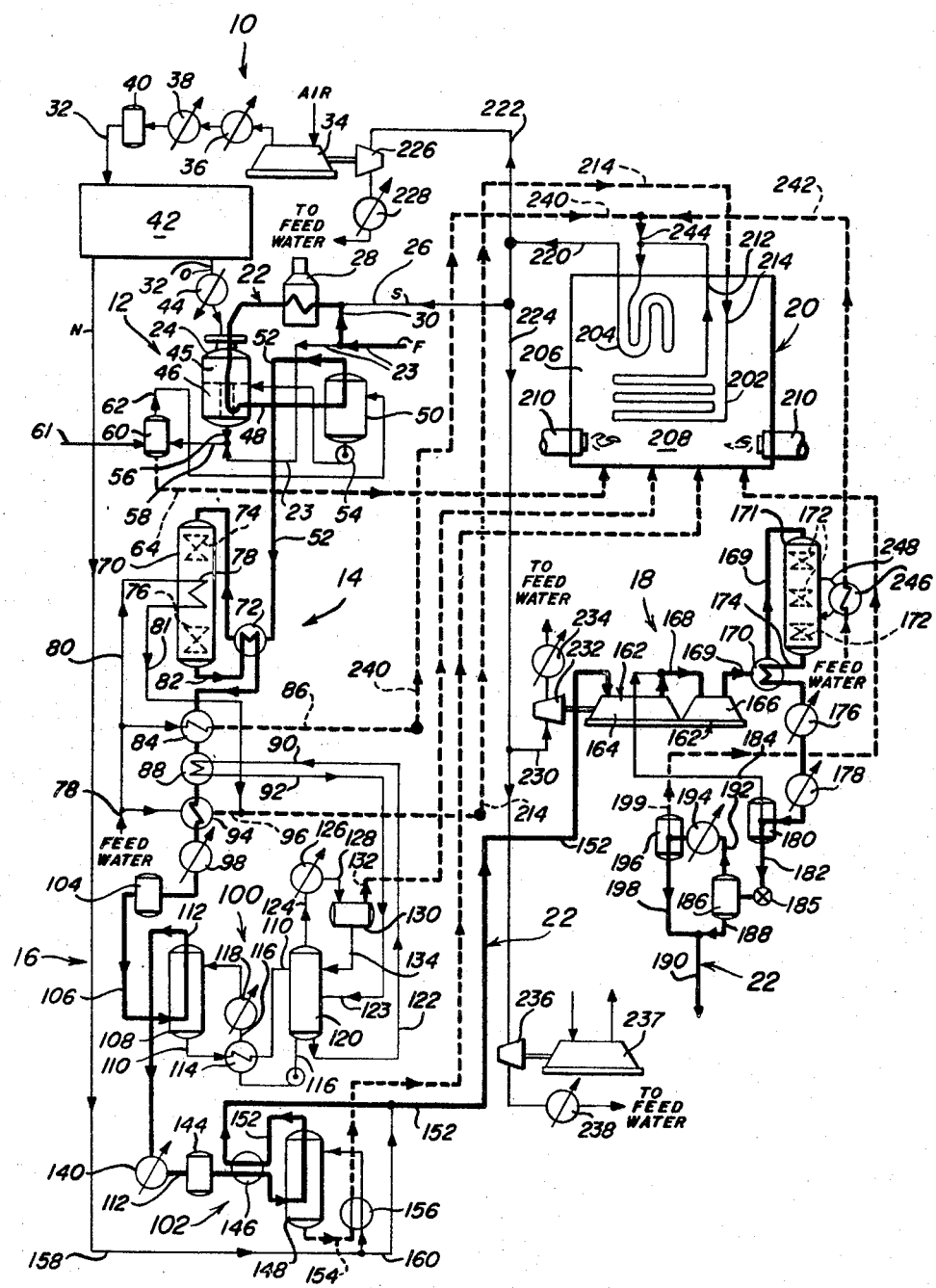

United States Patent Office 3,432,265
Patented Mar. 11, 1969

3,432,265
AMMONIA PRODUCTION PROCESS
Robert A. McCallister, Mountain Lakes, N.J., and Alan M. Sinclair, Milan, Italy, assignors to Foster Wheeler Corporation, Livingston, N.J., a corporation of New York
Filed Apr. 13, 1967, Ser. No. 630,666
U.S. Cl. 23—197     8 Claims
Int. Cl. C01c 1/04; C01b 2/30

ABSTRACT OF THE DISCLOSURE

The partial oxidation of a carbonaceous fuel for the synthesis of ammonia in which a waste heat vapor generator is provided for introducing steam into the process. Heat is recovered by reheating steam from the process and returning the process gases to the vapor generator for combustion.

BACKGROUND OF THE INVENTION

There are a number of processes used for the production of synthetic ammonia, one of which is the partial oxidation of hydrocarbons which involves the reaction of a hydrocarbon feed stock with a limited quantity of oxygen in order to obtain a gas stream consisting essentially of carbon monoxide and hydrogen. Subsequently, the carbon monoxide is reacted with steam to yield additional hydrogen and the synthesis gas is then purified and nitrogen is added to meet the requirements of ammonia synthesis in order to obtain the required ammonia product. An alternate process scheme for the production of ammonia involves using catalytic steam reformation of light hydrocarbon stock such as naphtha to produce the required hydrogen.

The economic considerations involved in selecting a particular ammonia process include the cost of the process feed stock, fuel, electricity, and the initial plant investment. Although the initial plant investment is generally greater for a partial oxidation ammonia plant than for a catalytic reformation plant, this additional capital investment may be offset by substantial savings in operating costs for the partial oxidation process. A further problem encountered in the production of ammonia is concerned with the utilization of unreacted carbon and oil. Another factor which usually enters into the choice of a particular process is the particular hydrocarbon feed stock which is available. For example, the partial oxidation process can utilize almost any carbonaceous fuel including coal, while in some of the other processes for the production of ammonia the rising costs and unavailability of fuel such as naphtha may be a prime consideration. Still another point which must be considered in the choice of an ammonia process relates to the utilization of low quality feed stocks which normally have limited commercial applications.

In accordance with the present invention, an ammonia production process has been developed which substantially reduces the operating costs of the partial oxidation process. This is accomplished by utilizing heat recovery from the process streams, by generating steam in a process waste heat vapor generator and recovering substantial additional quantities of heat by preheating the boiler feedwater. By utilizing heat recovered in this manner it is possible to reduce the overall plant operating requirements. The vapor generator contemplated in accordance with the instant invention provides for the generation of steam which can be used for providing motor power for the operation of the major compression and pumping equipment in the ammonia production plant. The high pressure steam from the boiler can be conveyed to steam turbines directly coupled to pumps and compressors or alternatively may be used in condensing steam turbines which drive electric generators, for coupling to motor drives. By providing superheating facilities in the boiler, the overall efficiency of the heat recovery during the ammonia production process is substantially increased. The unreacted carbon from the gas generation process can be conveyed to the vapor generator for combustion. Further, the waste heat vapor generator in accordance with the present invention provides a means of converting the various waste product gases, such as hydrogen sulfide into materials which usually can be vented in accordance with existing air pollution standards, thereby serving as a means of recovering heat from these otherwise wasted polluted gases. The large quantities of noxious carbon dioxide and hydrogen sulfide resulting from the ammonia process, can be handled in the vapor generator to lessen the danger for poisoning the plant personnel. Also, the heat from the carbon monoxide in the process which is frequently wasted, and the impurities normally exhausted during the ammonia synthesis can be conveyed back to the vapor generator for heat recovery.

Further, in the partial oxidation process a certain amount of steam is required to directly combine with hydrocarbon fuel. The utilization of a high pressure waste vapor generator in accordance with the present invention allows for the elimination of relatively low capacity, steam generators which are normally required in partial oxidation processes for introducing live steam into the process. Thus, the ammonia production process in accordance with the present invention results in a reduction of the operating costs by improving the overall thermal efficiency of the partial oxidation process.

SUMMARY OF THE INVENTION

In accordance with an illustrative embodiment, demonstrating objects and features of the present invention there is provided a process for the synthesis of ammonia gas by partial oxidation of a hydrocarbon through contact with steam and oxygen, resulting in a process gas stream comprising hydrogen and carbon monoxide with traces of impurities comprising carbon dioxide and methane. This gas stream is passed through a shift conversion unit in which there is provided a catalyst comprising a mixture of iron oxide and chromium oxide which enhances the reaction between the carbon monoxide and steam such that additional hydrogen and carbon dioxide are formed. The gas stream is then scrubbed to remove the carbon dioxide, and again scrubbed resulting in the removal of the carbon monoxide. Nitrogen is then added to the process stream to meet the requirements of ammonia synthesis. Ammonia gas is then formed through the reaction of hydrogen and nitrogen under pressure in the presence of a catalyst. A waste heat vapor generator is utilized in the process such that superheated steam can be directly utilized in the partial oxidation cycle, and heat otherwise lost during the course of the process, can be returned to the vapor generator for combustion. Thus, the fuel oil and carbon normally exhausted after the partial oxidation and the waste gases normally exhausted during the carbon dioxide removal, carbon monoxide removal and ammonia synthesis are conveyed to the combustion section of the vapor generator.

BRIEF DESCRIPTION OF THE DRAWINGS

The above brief description as well as further objects, features, and advantages of the present invention will be more fully appreciated by referring to the following description of a presently preferred by nonetheless illustrative embodiment in accordance with the present invention when taken in connection with the accompanying drawing, wherein there is shown a schematic representative of the ammonia production process.

DESCRIPTION OF THE PREFERRED EMBODIMENT

Referring now specifically to the drawing there is shown an ammonia production plant generally designated by the reference numeral 10 which comprises a partial oxidation zone 12, shift conversion zone 14, gas removal section 16, ammonia synthesis zone 18, and waste reheat vapor generator 20. The main process gas stream is shown in the drawing by a continuous heavy solid line 22 beginning with the introduction of the carbonaceous fuel and terminating with the formation of ammonia gas. In accordance with the present invention, any hydrocarbon such as fuel oil or coal can be introduced into the process stream 22 which contains oxygen. In the partial oxidation zone 12, oxygen and the steam from vapor generator 20 react with the carbonaceous fuel which results in a process stream 22 that leaves oxidation zone 12 comprising hydrogen and carbon monoxide with traces of impurities essentially comprising carbon dioxide and methane. The process stream 22 from oxidation zone 12 is conveyed to the shift conversion zone 14 which is provided with an iron and chromium oxide catalyst, where carbon dioxide and additional hydrogen are formed. The process gas stream 22 is then passed to the gas removal section 16 where the carbon dioxide and carbon monoxide are removed by scrubbing. The process gas stream 22, which is essentially comprised of hydrogen and nitrogen, is then conveyed to ammonia synthesis zone 18, where the hydrogen and nitrogen are compressed and then reacted in the presence of a catalyst to form the ammonia product. While it is preferable to introduce steam from the vapor generator 20 into the partial oxidation zone 12, it should be understood that it is also possible to introduce additional steam directly into the shift conversion zone 14. During the operation of ammonia production plant 10, heat is recovered which is conveyed back to the vapor generator 20 for combustion and reheating, as indicated in the drawing by the heavy broken lines. The steam from the vapor generator 20 in addition to being introduced directly into the process, can also be utilized for the production of electrical energy or as a substitute for electrical energy by providing means for driving the turbines, thereby directly supplying the prime mover requirements of ammonia plant 10.

Partial oxidation zone

A more detailed description will now be given of the operation of ammonia production plant 10, wherein fuel oil designated by the reference letter F is introduced into the process stream 22 in partial oxidation zone 12 through line 23 which is connected to the outlet of a partial oxidation generator 24. Relatively high pressure superheated steam from vapor generator 20, designated by the letter S, is introduced into the process stream 22 in partial oxidation zone 12 through steam line 26 which is connected to a fired heater 28. A connecting line 30 between fuel line 23 and steam line 26 is provided for mixing the fuel oil and steam S which is conveyed into the fired heater 28. The partial oxidation generator 24, the upper portion of which is refractory lined, is connected to fired heater 28 by line 26 through which the mixture of fuel oil and steam is conveyed to oxidation generator 24. In order to gasify the fuel oil and steam mixture in oxidation generator 24, it is necessary to introduce an oxygen stream which usually comprises at least 90% oxygen. Accordingly, the oxygen stream designated by the letter O, is introduced into partial oxidation generator 24 by means of a supply line 32. Outside air is conveyed into supply line 32 which has connected therein a compressor 34, water cooled heat exchanger 36, refrigerant cooled heat exchanger 38 and separator 40. The air from heat exchanger 38 may contain condensate which can be removed in the separator 40. An air separation unit 42 is connected in line 32 for the formation of the oxygen stream O and a nitrogen stream designated by the letter N. A waste stream which has not been shown in the drawing also may be formed to eliminate nay impurities and enrich the oxygen stream O. It should be noted that in actual practical, the oxygen content obtained may be in the 98% range at 40° F. and 1350 p.s.i.a. The oxygen rich air is passed through a heat exchanger 44 connected in line 32 between air separation unit 42 and oxidation generator 24.

The oxidation generator 24 includes a refractory lined reactor chamber 45 in flow communication with a quenching chamber 46, with lines 26 and 32 connected to the entrance of reactor chamber 45. The oxygen O and steam S are reacted with the fuel F in reactor chamber 45 resulting in the partial oxidation and gasification of the fuel oil F such that the process stream 22 which is conveyed into quenching chamber 46 comprises a gaseous mixture of hydrogen and carbon monoxide with traces of impurities essentially comprised of carbon dioxide, methane, and free carbon. From reactor chamber 45 the process stream 22, which is at a relatively high temperature in the 2500° F. range, is conveyed to quenching chamber 46 where there is provided a water bath for lowering the temperature. The process stream 22 leaves quenching chamber 46 through line 48 which is connected to a scrubber unit 50. Thus, process stream 22 in scrubber unit 50 which comprises a saturated gas with small quantities of free carbon is scrubbed to remove this free carbon. The process stream 22 passes through outlet line 52 from scrubber unit 50, and a line 54 is provided to convey the water and free carbon from scrubber unit 50 to quenching section 46. The water and free carbon is conveyed out of section 46 through line 56 which forms a junction with fuel line 23 and a line 58 that is connected to a separator unit 60. In separator unit 60 it is possible to separate the water while combining the oil and carbon slurry, by the introduction of an extraction oil through line 61. Thus, the water is conveyed from separator 60 back to scrubber 50 through line 62, and the oil and carbon slurry is conveyed from separator 60 through line 64 back to vapor generator 20 for combustion.

Shift conversion zone

The process stream 22 from scrubber unit 50 is conveyed through outlet line 52 to the shift conversion zone 14, which includes a shift conversion vessel 70. An indirect heat exchanger 72 is connected downstream in line 52, and an inlet catalyst bed 74 and outlet catalyst bed 76 is located at the entrance and exit, respectively, in shift conversion vessel 70. The process stream 22 in line 52 upstream of heat exchanger 72 is at approximately 510° F., and downstream of heat exchanger 72 is at 660° F. The catalyst in beds 74 and 76 comprises a mixture of iron and chromium oxides and approximately 70% of the process stream 22 which has passed through catalyst bed 74 is converted to carbon dioxide and additional hydrogen. The resultant process stream 22 from catalyst bed 74 which is at approximately 900° F. and essentially comprised of hydrogen, carbon monoxide, and carbon dioxide, is passed through a heat exchanger 78 which has an inlet line 80 for conveying feedwater from vapor generator 20 in heat exchange relation to process stream 22, and an outlet line 81 is provided for returning the heat absorbed from process stream 22 back to the vapor generator. The process stream 22 from heat exchanger 78 which is at approximately 650° F. is then passed through outlet catalyst bed 76 and out of shift conversion vessel 70 through an outlet line 82 which passes through heat exchanger 72. The process stream 22 which leaves outlet catalyst bed 76 is at approximately 710° F., and there is essentially a complete conversion to carbon dioxide and additional hydrogen in process stream 22. The outlet line 82 is connected to an indirect heat exchanger 84, which receives feedwater from line 80 and passes it through line 86 that is connected to vapor generator 20. By referring to the heavy broken line 86 in the drawing, it can be appreciated that heat exchanger 84 serves as a means of returning steam to vapor generator 20 for reheating. Downstream of heat exchanger 84 there is provided a heat exchanger 88 through which the process stream 22 from heat exchanger 84 is passed, and an inlet line 90 in flow communication with outlet line 92 passes heat exchange medium through heat exchanger 88 from gas removal section 16. Further downstream in line 82 there is located a heat exchanger 94 for receiving the process stream 22 from heat exchanger 88, and the heat transfer medium consisting of feedwater is passed through heavy broken line 96 which is in flow communication with the vapor generator 20. Before entering the gas removal section 16, the process stream 22 from heat exchanger 94 is conveyed through a direct heat exchanger 98. By utilizing heat exchangers 84, 88, 94, and 98 in lines 82, the temperature of the process stream 22 which enters gas removal section 16 can be reduced to a minimum thereby preventing excess heat absorption during gas removal.

Gas removal section

The gas removal section 16 comprises a carbon dioxide removal unit 100 and a carbon monoxide removal unit 102. The carbon dioxide removal unit 100 includes a condenser-separator 104 which receives the process stream 22 from line 82. After the water has been separated from the process stream 22 in condenser-separator 104, the process stream is conveyed through an outlet line 106 to an absorber tower 108 which is provided to pick up substantially all of the carbon dioxide and other acid gases such as hydrogen sulfide. The absorbing medium in the tower 108 typically consists of monoethanolamine, triethanol amine or potassium carbonate. The process stream 22 is then conveyed through an outlet line 112 to the carbon monoxide removal unit 102. The carbon dioxide which is removed from process stream 22 is conveyed from the absorber tower 108 through outlet line 110 to heat exchanger 118 that is located between heat exchanger 114 and absorber tower 108. The downstream portion of line 110 and the upstream portion of line 116 are connected to a regeneration tower 120 which receives the heat exchange medium through lines 122 and 123 that are respectively connected in flow communication, with lines 90 and 92 of heat exchanger 88.

The absorbing medium in tower 108 picks-up acid gas from process stream 22 and a rich acid gas solution is conveyed to regeneration tower 120. A stripping operation occurs in tower 120 that is enhanced through a reduction in the partial pressure of the acid gases by steam from line 123, and the steam also provides the heat required to regenerate the solution. Thus, an acid-gas stream is conveyed out of tower 120 through line 124 into a chiller 126, such that sufficient cooling occurs to maintain a proper water balance in carbon dioxide removal system 100. The acid gas stream is then passed out of chiller 126 through line 128 into a separator vessel 130 for separating the condensate from the acid gas. The acid gas which is essentially comprised of carbon dioxide, hydrogen sulfide and carbonyl sulfide is exhausted through line 132 to vapor generator 20 for combustion, and the condensate is returned to regeneration tower 120 by line 134. It should be noted that by providing the relatively large capacity vapor generator 20, it is possible to handle large volumes of carbon dioxide and hydrogen sulfide gas mixtures, so that the hydrogen sulfide can be converted to water and sulphur dioxide, and the carbon dioxide can be vented into the atmosphere.

The process stream 22 from line 112 is passed to the carbon monoxide removal section 102 by first conveying the gas into a refrigerated unit 140 and then to a separator 144. Downstream of line 112 there is provided a parallel flow heat exchanger 146 and scrubbing tower 148 in which the process stream 22 is scrubbed with liquid nitrogen to pick up the carbon monoxide, with the nitrogen acting as an absorbing medium for the carbon monoxide removal. The process stream 22 which is essentially comprised of nitrogen, hydrogen, methane and argon is conveyed out of scrubbing tower 148 in the direction of ammonia synthesis unit 18 through outlet line 152 that passes through parallel flow heat exchanger 146. A return line 154 is connected to scrubbing tower 148 for conveying the carbon monoxide to vapor generator 20 through a parallel flow heat exchanger 156. The gas stream in line 154 is at approximately −330° F. prior to entering heat exchanger 156, and the stream is brought to approximately the ambient temperature range in order to recover the refrigeration capacity of the stream prior to its return to the vapor generator 20. Thus, the vapor generator 20 is in a position to recover the heat of combustion from the stream in line 154, and at the same time minimize the effect of the carbon monoxide by converting it to carbon dioxide. The nitrogen N from the separation unit 41 is conveyed through heat exchanger 156 into scrubbing tower 148 by line 158. A branch line 160 is connected to line 158 and line 152 for introducing additional nitrogen through stream N to process stream 22 in accordance with the stoichiometric ratio required for producing the ammonia product.

Ammonia synthesis zone

The process stream 22 from carbon monoxide removal section 102 is passed through line 152 to the ammonia synthesis zone 18 and enters a centrifugal compressor 162 which is a two-stage unit having a first stage 164 and a second stage 166. A recirculation line 168 connects the first stage 164 to the second stage 166 in compressor 162, and an outlet line 169 is connected to the second stage 166 for leading the process stream 22 through a parallel flow heat exchanger 170 into a reactor vessel 171. Three catalytic beds designated 172 are typically provided in reactor vessel 171 for enhancing the reaction of the nitrogen and hydrogen in process stream 22 to form ammonia in accordance with the following reaction:

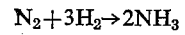

$$N_2 + 3H_2 \rightarrow 2NH_3$$

The catalyst which can be used in beds 172 consists of any of the following mixtures: magnetite ($Fe_3O_4$), potassium oxide ($K_2O$) and aluminum trioxide ($Al_2O_3$); magnetite, potassium oxide, aluminum trioxide, and calcium oxide (CaO); magnetite, potassium oxide, aluminum trioxide, and magnesium oxide (MgO); or magnetite, potassium oxide, aluminum trioxide, calcium oxide, magnesium oxide, and silicon dioxide ($SiO_2$). The process stream 22 essentially comprised of ammonia product and unreacted hydrogen and nitrogen is conveyed through an outlet line 174 connected to the reactor vessel 171, which passes through heat exchanger 170 to a water cooled heat exchanger 176 and into a refrigerated heat exchanger 178 to a vapor separator 180. The vapor separator 180 receives the process stream 22 which is essentially comprised of liquid ammonia product and a vapor phase of hydrogen and nitrogen. The vapor phase also comprises small amount of impurities essentially comprised of argon, methane, and ammonia gas which are flashed off. The liquid ammonia product is passed through outlet line 182 and the vapor phase is passed through return line 184 to the first stage 164 of compressor 162. Outlet line 182 is provided with a pressure reduction valve 185 which is connected between separators 184 and 186. The liquid ammonia product from separator 184 is flashed into separator 186 to obtain another liquid phase and vapor phase. Separator 186 is provided with an outlet line 188 for conveying liquid ammonia product into a main line 190 which leads to storage facilities for the ammonia product which are not shown in the drawing. The vapor phase gas in separator 186 is passed through return line 192 into a chiller 194 to condense the ammonia product from the gas stream, thereby enhancing the overall ammonia recovery. There is a mixture in separator 196 of vapor, that is essentially comprised of hydrogen, argon, nitrogen, ammonia and methane, and liquid ammonia which is received from chiller 194. An outlet line 198 is provided between separator 196 and exit line 190 for conveying the liquid ammonia product to the storage area, and a return line 199 is provided for conveying the vapor back to vapor generator 20 for combustion.

Waste heat vapor generator

The vapor generator 20 includes a vapor generating section 202 in fluid flow communication with a vapor superheater section 204. The vapor generating section 202 and vapor superheater section 204 are mounted in the walls of a furnace 206 having a combustion section 208 with burners 210.

The vapor generating section 202 is connected to superheater section 204 by means of line 212 and feedwater is returned to vapor generating section 202 by means of return line 214. As shown in the drawing, the return line 214 is connected to lines 78 and 96 for returning feedwater from heat exchanger 94 to vapor generating section 202 for reheating.

The superheater section 204 is connected to outlet line 220 which forms a Y-type connection with line 222 and 224. Line 222 leads to a turbine 226 which drives air compressor 34, and downstream of line 222 there is provided a heat exchanger 228 prior to the feedwater being returned to vapor generator 20. A Y-type connection is located midstream in line 224 with line 230 being connected to a turbine 232 for driving the compressor 162, and a heat exchanger 234 is connected in line 230 prior to the return of the feedwater to the vapor generator 20. Downstream in line 224 there is provided a turbine 236 for operating compressor 237, and a heat exchanger 238 is connected in line 224 prior to the return of the feedwater to the vapor generator 20. The compressor 237 serves as a central refrigeration source for cooling the various chilling units and heat exchangers, with the refrigerant inlet and outlet line being schematically shown in the drawing.

The return of vapor to superheater 204 is achieved by providing a Y-type connection between return line 240, return line 242, and inlet line 244 of superheater 204. Accordingly, vapor passes from heat exchanger 84, through line 86 which is connected to line 240, into line 244. Vapor from ammonia synthesis zone 18 is passed from a heat exchanger 246, through line 242, into line 244. The heat exchanger 246 is connected to vessel 171 by line 248, such that the temperature of the vapor can be raised and passed from line 242 into line 244.

In accordance with the present invention, the ammonia production plant 10 is operated at peak efficiency through the provision of the relatively high capacity reheat vapor generator 20. Thus, by producing superheated steam in the 925° F., 1600 p.s.i.a., range in superheater section 204, it is possible to economically provide power for the process turbine drives 226, 232, and 236, and the superheated steam can also be directly utilized in partial oxidation zone 12. Further, waste heat products from the ammonia production plant 10 are returned to vapor generator 20. Accordingly, the heavy broken lines 240, 242, and 214 show the process heat return scheme for reheating feedwater and steam in vapor generator 20 wherein: superheated steam which is approximately in the 600° F., 1600 p.s.i.a. range is returned to superheater section 204 from heat exchangers 94 and 246; and feedwater which is approximately in the 400° F., 160 p.s.i.a. range is returned to vapor generating section 202 from heat exchanger 94. Referring to the heavy broken lines 64, 132, 154, and 199, the process heat return scheme for the combustion of by-products in combustion section 208 is shown wherein: the fuel and carbon slurry from the partial oxidation zone 12 are returned through line 64; the hydrogen sulfide, carbon dioxide and carbonyl sulfide from removal zone 100 are returned through line 132; the carbon monoxide from removal zone 102 is returned through line 154; and the impurities comprising hydrogen, argon, nitrogen, ammonia and methane from ammonia synthesis zone 18 are returned through line 199. Thus, it can be appreciated that in accordance with the present invention there has been provided an ammonia production process in which a high capacity vapor generator has been utilized, to meet the direct steam requirements for the partial oxidation, and also to serve as a means of providing motive power and recovering heat which would normally be wasted in the process.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:
1. A process for the synthesis of ammonia from a heavy oil feed stock wherein heat products are exhausted which comprises:
   superheating steam in a waste heat vapor generator,
   reacting oxygen and the superheated steam with said feed stock to obtain partial oxidation such that a gas stream is formed essentially comprising hydrogen and carbon monoxide with traces of impurities essentially comprising carbon dioxide and methane, and exhausting a mixture of fuel oil and free carbon,
   returning the exhausted fuel oil and carbon mixture to said vapor generator for combustion,
   contacting said gas stream with a catalyst comprising a mixture of iron and chromium oxides in a shift conversion zone such that additional hydrogen and carbon dioxide are formed,
   scrubbing the gas stream from the shift conversion zone in a carbon dioxide zone in which the carbon dioxide and hydrogen sulfide are removed,
   scrubbing the gas stream from the carbon dioxide zone in a carbon monoxide zone in which the carbon monoxide is removed,
   compressing the gas stream from the carbon monoxide zone which is essentially comprised of hydrogen and nitrogen in a synthesis zone and then contacting the compressed gas stream with a catalyst such that the hydrogen and nitrogen react to form ammonia product, which is separated and recovered, with said catalyst being selected from the group consisting of mixtures of magnetite and: potassium oxide and aluminum trioxide; potassium oxide, calcium oxide and aluminum trioxide; potassium oxide; calcium oxide, magnesium oxide and aluminum trioxide, and potassium oxide, calcium oxide, magnesium oxide, aluminum trioxide and silicon dioxide; and exhausting steam, and
   returning the exhausted steam from said synthesis zone to said vapor generator for reheating.

2. A process according to claim 1 in which said steam from said shift conversion zone is exhausted and returned to said vapor generator for reheating.

3. A process according to claim 1 in which the carbon monoxide is returned to said vapor generator for combustion.

4. A process according to claim 1 in which during the synthesis of the ammonia there is exhausted a mixture of impurities essentially comprising hydrogen, argon, nitrogen, ammonia and methane, and said mixture is returned to said vapor generator for combustion.

5. A process for the synthesis of ammonia from hydrocarbon feed stock which comprises:
   superheating steam in a waste heat vapor generator which includes a vapor generating section operatively connected in flow communication with a superheating section, reacting oxygen and the superheated steam with the hydrocarbon feed stock in a partial oxidation zone such that a gas stream is formed essentially comprised of hydrogen and carbon monoxide with traces of impurities essentially comprised of carbon dioxide and methane and exhausting a mixture of fuel oil and free carbon, returning the exhausted fuel oil and carbon mixture to said vapor generator for combustion, contacting said gas stream with a catalyst comprising a mixture of iron and chromium oxides in a shift conversion zone such that additional hydrogen and carbon dioxide are formed and steam is exhausted, returning the exhausted steam from said shift conversion zone to said superheater section for reheating, scrubbing the gas stream from said shift conversion zone with a scrubbing medium in a carbon dioxide zone in which the carbon dioxide is removed and hydrogen sulfide, carbonyl sulfide, and the carbon dioxide are exhausted, and said scrubbing medium is selected from the group consisting of monoethanolamine, triethanolamine and potassium carbonate, returning the exhausted hydrogen sulfide, carbonyl sulfide and carbon dioxide to said vapor generator for combustion of said hydrogen sulfide and carbonyl sulfide, scrubbing the gas stream from said carbon dioxide zone with liquid nitrogen in a carbon monoxide zone such that the carbon monoxide is removed and exhausted, returning the exhausted carbon monoxide to said vapor generator for combustion, contacting nitrogen with the gas stream from the carbon monoxide zone in accordance with the hydrogen-nitrogen stoichiometric requirements for the production of ammonia, compressing the gas stream from the preceding step which is essentially comprised of hydrogen and nitrogen in a synthesis zone and then contacting the compressed gas stream with a catalyst such that the hydrogen and nitrogen react to form ammonia product, which is separated and recovered with said catalyst being selected from the group consisting of mixtures of magnetite and: potassium oxide, aluminum trioxide, potassium oxide, calcium oxide and aluminum trioxide; potassium oxide, calcium oxide, aluminum trioxide and magnesium oxide; and potassium oxide, calcium oxide, aluminum trioxide, magnesium oxide, and silicon dioxide; and exhausting steam and a mixture of impurities comprising hydrogen, argon, nitrogen, ammonia and methane, and returning said mixture of impurities exhausted from the synthesis zone to said vapor generator for combustion, and returning the exhausted steam from said synthesis zone to said superheater section for reheating.

6. A process according to claim 5, wherein said vapor generating section includes a combustion section, and gas return lines connected to said combustion section in flow communication with said partial oxidation zone, shift conversion zone, carbon dioxide removal zone, carbon monoxide removal zone, and ammonia synthesis zone, in which said fuel oil, free carbon, hydrogen sulfide, carbonyl sulfide, carbon dioxide, carbon monoxide and mixture of impurities are conveyed through said gas return lines to said combustion section.

7. A process according to claim 6, wherein a feedwater return line is connected to said vapor generating section in flow communication with said shift conversion zone and steam return lines are connected to said superheating section in flow communication with said shift conversion zone and ammonia synthesis zone, in which feedwater is conveyed through said feedwater return line to said vapor generating section and steam is conveyed through said steam return lines to said superheater section.

8. A process according to claim 5, wherein a feedwater return line is connected to said vapor generating section in flow communication with said shift conversion zone and steam return lines are connected to said superheating section in flow communication with said shift conversion zone and ammonia synthesis zone, in which feedwater is conveyed through said feedwater return line to said vapor generating section and steam is conveyed through said steam return lines to said superheater section.

References Cited
UNITED STATES PATENTS

| | | | |
|---|---|---|---|
| 1,313,314 | 8/1919 | Metzger | 23—198 |
| 2,610,106 | 9/1952 | Gray | 23—199 X |
| 3,243,386 | 3/1966 | Nielsen et al. | 23—198 |

OSCAR R. VERTIZ, *Primary Examiner.*

H. S. MILLER, *Assistant Examiner.*

U.S. Cl. X.R.

23—198, 288

UNITED STATES PATENT OFFICE
CERTIFICATE OF CORRECTION

Patent No. 3,432,265　　　　　　　　　　　　　　　　　March 11, 1968

Robert A. McCallister et al.

It is certified that error appears in the above identified patent and that said Letters Patent are hereby corrected as shown below:

Column 2, line 67, "by" should read -- but --. Column 4, line 2, "nay should read -- any --; line 3, "practical" should read -- practice --. Column 6, line 19, "41" should read -- 42 --.

Signed and sealed this 31st day of March 1970.

(SEAL)
Attest:

Edward M. Fletcher, Jr.
Attesting Officer

WILLIAM E. SCHUYLER,
Commissioner of Paten